Patented Nov. 5, 1935

2,020,085

UNITED STATES PATENT OFFICE 2,020,085

BRUSH MOLDING COMPOSITION AND PROCESS OF MAKING THE SAME

Carleton N. Smith, Lakewood, and Newcomb K. Chaney, Cleveland Heights, Ohio, assignors to National Carbon Company, Inc., a corporation of New York No Drawing. Application March 11, 1932, Serial No. 598,304

3 Claims. (Cl. 106—22)

This invention relates to a molding composition and to a process for making the same; the composition being especially adapted for use in molding carbon brushes for electrical machinery. An object of our invention is to devise a preparation which shall be adapted for use in molding articles consisting principally of carbon and a binder, with or without additions such, for example, as powdered metallic particles. Another object of our invention is to form an article which shall have the binder evenly distributed upon the surface of the particles. These and other objects of our invention will be evident from the following specification.

Heretofore, it has been customary to distribute resins as binders in molding compositions on the fillers in various ways as by dissolving the resin in a suitable solvent, mixing with a filler material, drying and remilling; working the resin into the filler material on hot rolls; or dry milling the powdered material in its original form with the filler material. This invention provides an improved substitute for these processes when the forming of the article is to be by cold pressing at great pressures. It is especially adapted for use with vinyl resins such as are formed by the polymerization of vinyl compounds (such as chlorides or acetates). We have found the resin formed by the conjoint polymerization of 4 parts of vinyl chloride and 1 part of vinyl acetate especially suitable, but our invention is not to be limited to such a resin.

Our invention consists in the precipitation of resin from solutions in contact with filler material suspended in the precipitating material followed by filtering, washing and drying. The solution may well be in acetone and the precipitating medium may be water. Alternatively dry filler may be first incorporated with dissolved resin and then added to a precipitant with stirring or dissolved resin may be added to a precipitant in which filler material is suspended by agitation.

The following is one example of our process, 200 grams of graphite were moistened with sufficient acetone to make a thick paste; 2½ grams of a resin formed by the conjoint polymerization of 4 parts vinyl chloride and 1 part vinyl acetate were dissolved in the minimum quantity of acetone and then added to and thoroughly mixed with the graphite paste. This paste was then added gradually to 6 liters of water, filtered, washed upon a suction filter, air dried, and finally vacuum dried at 50° C. and 1 mm. pressure. The product resembled the original graphite in appearance with no particles of the resin appearing which were large enough to be visible under the microscope. Such a graphite composition is characterized by its ready agglomeration under pressure, the powder forming very thin adherent leaflets when pressed under the edge of a knife.

In carrying out this process the acetone solution in which the resin is polymerized may be added directly to the filler, and the first precipitation without additional milling or mixing will give a composition ready for molding. Our new process provides a means for preparing a superior molding composition with no operations other than those required in making the original precipitated resin, or the original polymerizing solution may be shipped to the consumer without further treatment, filler added, and the molding material prepared.

In preparing carbon brushes the coated conductive material is molded at about room temperature under pressures of from 5 to 30 tons per square inch. After molding the resin coating is converted to a relatively infusible pyro-resin by heating in air at a temperature of 125° to 200° C. for periods of from 1 to 16 hours.

While we have disclosed our invention as applied to carbon or graphite filler material, it is evident that it may be used with other fillers.

We claim:

1. A molding powder comprising mainly a finely divided conductive material, principally carbon, and a minor quantity of a vinyl resin identical with that formed by the conjoint polymerization of vinyl chloride and vinyl acetate, said vinyl resin being distributed on the surface of the conductive material in extremely fine subdivision.

2. Method of forming a molding material which comprises dissolving in a suitable solvent, a vinyl resin substantially identical with that formed by the conjoint polymerization of vinyl chloride and vinyl acetate, adding finely divided filler material thereto, precipitating the mixture of vinyl resin and filler by means of a non-solvent for said resin and drying the molding material thereby formed.

3. Method of forming a molding material which comprises dissolving a vinyl resin in a solvent therefor, forming a paste of finely divided carbon particles and water, mixing the paste and solution, adding the mixture to water and recovering the insoluble material thus formed.

CARLETON N. SMITH.
NEWCOMB K. CHANEY.